United States Patent Office 2,794,828
Patented June 4, 1957

2,794,828

PETROLEUM MAHOGANY SULFONATES WITH HIGH ALKALINE EARTH METAL CONTENT

Manuel Blumer, Petrolia, Pa., assignor to L. Sonneborn Sons, Inc., a corporation of Delaware No Drawing. Application April 10, 1953, Serial No. 348,115

8 Claims. (Cl. 260—504)

This invention relates to new and useful improvements in petroleum mahogany sulfonates with high alkaline earth metal content.

Alkaline earth metal petroleum mahogany sulfonates in petroleum oil solution constitute valuable products. These find application for many industrial uses including, for instance, as stabilizing agents for plastics, paint dryers, rust preventives and others. Their value depends to a large extent upon the total amount of alkaline earth metal content in the solution. It is for this reason conventional practice to increase the alkaline earth metal content of these petroleum mahogany sulfonate oil solutions by adding additional amounts of such metals in the form of aqueous slurries of their hydroxides. The resultant products form so-called basic sulfonates. Their alkaline earth metal content is, however, still not as high as may be desirable for many purposes. Thus, for instance, the best that may be accomplished in the case of a calcium sulfonate solution containing 40% calcium sulfonate by adding thereto, for example, a lime slurry, is a top of 9.6% calculated on calcium sulfate ash content (2.93% calcium).

I have discovered that it is possible to appreciably raise the alkaline earth metal content of alkaline earth metal sulfonate solutions in oil by intimately contacting such solution with an aqueous slurry of such metal in hydroxide form and containing sucrose or dextrose.

In accordance with the invention a suitable alkaline earth metal sulfonate solution in a petroleum hydrocarbon oil, a large portion of which may be so-called "occluded" oil, and preferably containing about 20–40% by weight of said sulfonate, is intimately contacted with an aqueous slurry of the alkaline earth metal hydroxide and preferably containing the latter in from 5–10% by weight of said solution, the said slurry further containing sucrose or dextrose and preferably in from 2–10% by weight of said solution. The resulting mix is then dehydrated to remove excess water and the oil product is thereafter filtered to remove solids therefrom.

The invention is addressed by way of its preferred embodiment to calcium mahogany sulfonate solutions with a high calcium content. In order not to introduce too much water into the oil solution of the sulfonate and thus unnecessarily prolong the dehydration period, it is desirable to limit the aqueous slurry to one of about 10% by weight of the hydroxide.

The following experiments illustrate the use of sucrose in accordance with the invention:

EXAMPLE 1

A sodium petroleum mahogany sulfonate (molecular weight about 450) was diluted with petroleum hydrocarbon oil to produce a solution of about 40% sulfonate. This solution was then converted to calcium sulfonate by double decomposition in the conventional well known manner with a 20% calcium chloride solution.

To one portion of the calcium sulfonate oil solution obtained as above was added 7.5% by weight of calcium hydroxide as a 10% aqueous slurry, whereupon the resulting mixtures having been thoroughly stirred and intimate contact having been obtained between the products, was dehydrated and filtered.

To two other portions of the calcium mahogany sulfonate prepared as above set forth, there were added respectively mixtures of calcium hydroxide plus sucrose as a 10% aqueous slurry, in one case the sucrose content being about 3% by weight of oil solution and in the other being about 6% by weight of such oil solution, calcium hydroxide content being in both cases the same as that specified for the above first portion.

In all cases the intimately mixed oil solutions were dehydrated and then filtered. The filtrates were tested, the data being set forth in the following Table I.

*Table I*

BASIC CALCIUM SULFONATES OF INCREASED CALCIUM CONTENT USING SUCROSE

[Used: Calcium sulfonate (Example 1) 7.5% calcium hydroxide.]

| Percent sucrose added | 0 | 3.0 | 6.0 |
|---|---|---|---|
| Percent sulfate ash | 9.56 | 10.54 | 11.55 |
| Percent calcium | 2.81 | 3.10 | 3.40 |
| Free alkalinity—mg. KOH/g | 20.5 | 32.0 | 39.0 |
| Percent Basicity | 28.5 | 36.5 | 40.5 |
| Saybolt Vis. 210 | 120 | 160 | 440 |

It is apparent that the addition of the sucrose has increased the amount of calcium content of the sulfonate solution. It is further noted that there is a definite increase in the free alkalinity by the use of the sucrose and thus a higher basicity percentage. This is for many purposes a very valuable aspect and the obtaining of a basicity of this magnitude is extraordinary when compared with the usual basicity of alkaline earth metal sulfonate solutions, which is normally below 30%.

Though the above and following example illustrate the invention in connection with calcium mahogany sulfonate solutions, similarly advantageous results are obtained when the invention is applied to the corresponding barium and strontium etc. salts.

The basic calcium petroleum mahogany sulfonates obtained in accordance with Example I and Table I, including those obtained in accordance with the invention by the addition of sucrose and showing a high calcium content, were all clearly soluble in petroleum oils of light color and fairly fluid. The increased basic calcium content did, however, raise the viscosity. In most cases from 2–10% of sucrose by weight of the sulfonate solution will give the desired results, though in some cases an excess of 8% of such sucrose will not materially add to the increase in alkaline earth metal content obtained.

It is further possible to obtain, if desired, a substantially neutral alkaline earth metal petroleum mahogany sulfonate solution in accordance with the invention. This is readily accomplished by treating the basic sulfonate solution with carbon dioxide. Thus, for instance, when passing carbon dioxide through the three solutions of the basic sulfonate referred to in Example 1 and Table I above, all three sulfonates remained bright and clearly oil-soluble but increased in viscosity. No precipitates formed during the carbon dioxide treatment and refiltration was not necessary. The characteristics of the three carbon dioxide treated products are given in the following Table II.

Table II

BASIC CALCIUM SULFONATES MADE WITH SUCROSE AND TREATED WITH CARBON DIOXIDE

[Treatment temp.: 200-250° F.]

| Percent sucrose used | 0 | 3 | 6 |
|---|---|---|---|
| Percent Sulfate ash | 9.60 | 10.49 | 11.40 |
| Percent Calcium | 2.85 | 3.10 | 3.36 |
| Free alkalinity, mg. KOH/g | 0 | 1.0 | 2.0 |
| Percent Basicity | 0 | 1.0 | 1.5 |
| Saybolt Vis. 210 | 102 | 180 | 800 |

The following example is furnished by way of illustration of the use of dextrose in accordance with the invention.

EXAMPLE 2

The same basic calcium sulfonate solutions were prepared as specified in Example 1, except that in the case of the two sulfonate products made with sucrose, there was used in this case 3% by weight and 6% by weight respectively of dextrose. The characteristics of the resultant products on a comparison basis with a product not containing dextrose are shown in the following Table III.

Table III

BASIC CALCIUM SULFONATES PREPARED WITH DEXTROSE (CORN SUGAR)

[Used: calcium sulfonate (Example 1) 7.5+ calcium hydroxide.]

| Percent dextrose used | 0 | 3 | 6 |
|---|---|---|---|
| Filtration time for 300 cc min | 9 | 10 | 30 |
| Percent sulfated ash | 9.51 | 11.26 | 12.71 |
| Percent Calcium | 2.79 | 3.31 | 3.74 |
| Free alkalinity—Mg.KOH/g | 23.5 | 17.0 | 17.0 |
| Percent Basicity | 30.0 | 18.0 | 16.0 |
| Saybolt Vis. 210 | 125 | 137 | 170 |

As will be seen from the foregoing table, the use of the dextrose very definitely increased the metal content from 2.79 to 3.74% calcium, i. e., an increase of 33% (for the 6% dextrose). It is to be noted that whereas in the case of use of sucrose a very appreciable increase in basicity occurs, the percent basicity with the use of dextrose decreases markedly.

I claim:

1. Method for obtaining a petroleum mahogany sulfonate product with high alkaline earth metal content, which comprises intimately contacting an alkaline earth metal sulfonate in petroleum hydrocarbon oil solution with an aqueous slurry of alkaline earth metal hydroxide containing 2–10% by weight of a member of the group consisting of sucrose and dextrose, dehydrating and filtering the resultant product.

2. Method of obtaining a petroleum mahogany sulfonate product with a high alkaline earth metal content, which comprises intimately contacting an alkaline earth metal sulfonate in petroleum hydrocarbon oil solution containing said sulfonate in about 20–40% by weight, with an aqueous slurry of from 5–10% by weight of said solution of an alkaline earth metal hydroxide, and containing from 2–10% by weight of said solution of a member of the group consisting of sucrose and dextrose, thereafter dehydrating and filtering the resultant product.

3. Method according to claim 2 in which said group member is dextrose.

4. Method according to claim 3 in which said alkaline earth metal of said sulfonate and said hydroxide is calcium.

5. Method according to claim 4 in which said aqueous slurry is about a 10% by weight slurry of said hydroxide.

6. Method according to claim 2 in which said group member is sucrose.

7. Method according to claim 6 in which said alkaline earth metal of said sulfonate and said hydroxide is calcium.

8. Method according to claim 7 in which said aqueous slurry is about a 10% by weight slurry of said hydroxide.

References Cited in the file of this patent

UNITED STATES PATENTS

| 2,573,796 | Latier et al. | Nov. 6, 1951 |
| 2,616,906 | Asseff et al. | Nov. 4, 1952 |
| 2,616,925 | Asseff et al. | Nov. 4, 1952 |